(12) United States Patent
Nykänen et al.

(10) Patent No.: US 6,574,678 B1
(45) Date of Patent: Jun. 3, 2003

(54) METHOD FOR INSTALLING SERVICES

(75) Inventors: Petri Nykänen, Tampere (FI); Kari Lehtinen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/257,777

(22) Filed: Feb. 25, 1999

(30) Foreign Application Priority Data

Feb. 27, 1998 (FI) .................................................. 980465

(51) Int. Cl.[7] .......................... G06F 13/00; G06F 13/10; G06F 13/14

(52) U.S. Cl. .................................. 710/10; 710/8; 710/9; 710/16; 710/19; 710/63

(58) Field of Search ........................... 710/8, 9, 10, 16, 710/19, 63; 370/384, 389

(56) References Cited

U.S. PATENT DOCUMENTS

| | | | |
|---|---|---|---|
| 5,655,148 A | * 8/1997 | Richman et al. ................. | 710/8 |
| 5,809,115 A | 9/1998 | Inkinen ..................... | 379/93.05 |
| 5,867,730 A | * 2/1999 | Leyda ........................... | 710/10 |
| 5,877,745 A | * 3/1999 | Beeteson et al. ............. | 345/156 |
| 5,881,366 A | * 3/1999 | Bodenmann et al. .......... | 455/66 |
| 6,009,480 A | * 12/1999 | Pleso ............................ | 710/8 |
| 6,137,473 A | * 10/2000 | Cortopassi et al. .......... | 345/156 |
| 6,163,538 A | * 12/2000 | Brown et al. ................ | 370/389 |
| 6,195,712 B1 | * 2/2001 | Pawlowski et al. ........... | 710/19 |
| 6,243,775 B1 | * 6/2001 | Porterfield ................... | 710/104 |
| 6,263,210 B1 | * 7/2001 | Takahashi ................... | 455/464 |

FOREIGN PATENT DOCUMENTS

| | | |
|---|---|---|
| EP | 0 716 371 A3 | 6/1996 |
| EP | 0 802 486 A1 | 10/1997 |
| EP | 0 803 802 A2 | 10/1997 |
| WO | WO 97/26721 | 7/1997 |

OTHER PUBLICATIONS

IBM Technical Disclosure Bulletin, vol. 39, No. 1, Jan. 1996, "Device Drivers via the Access Bus", pp. 135.

Finnish Official Action and English translation thereof.

"Infrared Data Association Link Management Protocol", Seaborne et al., Version 1.1, pp 1–98, 1996.

"Infrared Data Association Plug And Play Extension To Link Management Protocol", Infrared Data Association, pp 1–13, 1996.

* cited by examiner

*Primary Examiner*—Jeffrey Gaffin
*Assistant Examiner*—Tammara Peyton
(74) *Attorney, Agent, or Firm*—Perman & Green, LLP

(57) ABSTRACT

The invention relates to a method for installing at least one service (704, 705, 706) of at least one external device (MS1, MS2, MS3) to a data processor (PC, LPC, PR). Said at least one service (704, 705, 706) can be used for controlling the functions of said external device (MS1, MS2, MS3) from the data processor (PC, LPC, PR). In the method, a local area link is established for transferring information between said data processor (PC, LPC, PR) and said at least one external device (MS1, MS2, MS3). From said at least one external device (MS1, MS2, MS3), it is determined which are the services (704, 705, 706) available in it. In the data processor (PC, LPC, PR), at least one service packet. (701) is installed, which contains at least one of said services (704, 705, 706) available in the wireless communication device (MS1, MS2, MS3).

2 Claims, 14 Drawing Sheets

METHOD FOR INSTALLING SERVICES

The present invention relates to a method according to the preamble of the appended claim 1 for installing services in a data processor. The invention relates also to a system according to the method and to an external device, such as a wireless communication device.

Data transmission between computers and devices connectable to them is typically implemented by means of a cable, so that a data transmission cable is connected between these devices. In office use there may also be several computers and other external devices, such as printers, which are connected locally to the local area network. This local area network is normally implemented with cabling, such as Ethernet cabling. Recently, however, wireless coupling methods have been developed, for example, data transmission systems for short distances, working by infrared and radio signals. The use of these wireless data transmission systems is easier, because the user does not have to connect the cables to different devices, but it will be sufficient that the devices are in the operating range of the data transmission system. Regardless of the technique used to implement this data transmission system, defining the features of the devices and setting functional parameters is typically needed. The computer has to identify the types of the devices (printer, telecopier, wireless communication device, modem) communicating with it, in order to use the right data transmission mode. As a rule, this identification is conducted in such a way that the user starts up an installation program in the computer, in which all the required procedures for defining the device in question, in the operational environment of the computer are programmed. The device, such as a printer or a wireless communication device, is accompanied with a diskette or CD ROM, in which this installation program is located. In practice, this means that the installation program version is perhaps not the latest one at the moment of installation, wherein new features which are not at the user's disposal may be introduced after the program is supplied. Thus the user has to buy a newer installation program version if s/he wants to use the new features.

Recently this identification of the devices has been developed to be more automatic, wherein the computer tries to identify the devices which are in data transmission connection with it. The term "plug ang play" is used for this method. Hereinbelow, the term "automatic identification" will be used for this method in this description. Identification is implemented by means of data transmission between the computer and the external device, in which the device transmits information required in the identification to the computer. This, however, requires that a device driver or a corresponding program, suitable for the identification of the device, is installed in the computer.

Figure 1:
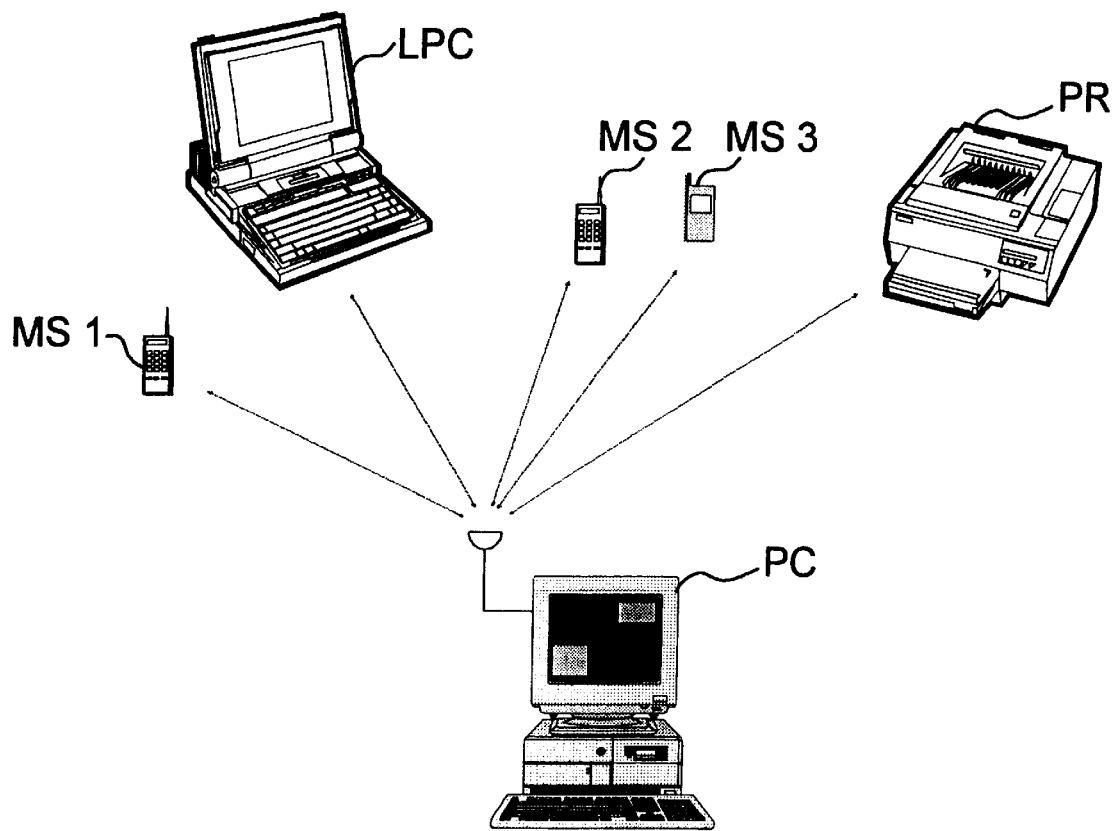

Infrared data transmission has been found relatively effective in short distances, because connecting cables can be avoided and various devices can be placed more freely. Nevertheless, in infrared data transmission, attention has to be paid to the fact that between communicating devices, there either has to be unobstructed visibility or the possibility to establish optical connection via reflecting surfaces. Different standards have been developed for this kind of data transmission, for instance the IrDA standard (Infrared Data Association). FIG. 1 presents a system, in which infrared data transmission is used between different devices. As an example, the system presents a desk-top computer PC to which a lap-top computer LPC, printer PR, and different wireless communication devices, such as mobile phones MS1, MS2, MS3 are connectable by means of infrared data transmission. In infrared data transmission according to the IrDA standard, it is possible to identify the infrared devices in the vicinity of this desktop computer. This desktop computer in a system according to FIG. 1 is a so-called host device which functions as a kind of a device controlling the system. According to the IrDA standard, in each device which contains means for infrared data transmission, identification data is stored, such as the name of the device, the dynamically definable address of the device, and State variables for indicating services supported by the device. The state variables indicate, for instance, which service class the device in question belongs to. Such service classes are, for example, a personal computer, a printer, a "plug and play" type device, a telecommunication terminal (telephone), etc. Thus, the wireless communication devices in the vicinity of the host device can be defined on the basis of this service class definition by examining the value of the telecommunication terminal state variable. The host device stores the information on the infrared data transmission devices it has detected and identified in its storage means.

In a situation where a new device suitable for infrared data transmission enters the vicinity of the host device, a corresponding external device identification is performed. This external device is detected for example in such a way that the host device transmits at intervals a query message, to which a reply message is transmitted by the devices that are located in the vicinity of the host device and are suitable for infrared data transmission. This reply message is received by the host device and used for defining, for example, the service class of the external device.

The aforementioned data transmission system according to the IrDA standard is based on a sandwich structure of seven layers called OSI (Open Systems Interconnection) presented by the International Standards Organization ISO. The IrDA standard protocol stack comprises the lowermost layer of the said OSI sandwich structure, i.e. the physical layer, the data link layer above that, the following network layer, and the uppermost layer, i.e. the application layer.

The implementation of the physical layer may vary in different devices. Usually, data transmission according to the IrDA-SIR specification is used, by means of which the speed 115.2 kbit/s can be achieved. Also faster infrared data transmission has been suggested for the IrDA standard (FIR, Fast Infra Red) in which the speeds 1.152 Mbits and 4 Mbits have been defined.

The abbreviation IrLAP is used to indicate the data link layer protocol. This protocol supports the identification of devices and the service that secures data transmission reliability. In this protocol layer other devices are also informed that infrared data transmission is available in this device.

The abbreviation IrLMP is used to indicate the network layer protocol. This protocol supports connection set-up on the service level and multiplexing of different data transmission streams.

The application layer contains services needed by the applications used in the device. One service required in every IrDA device is a so-called Information Access Service (IAS). This information access service includes a so-called server service and a client service. The client service is able to make enquiries to the server service in order to find out which services are supported by the host device. The server service retrieves the information from a local database, such as a database stored in the storage means of a desktop computer. This database contains service-specific information.

Devices supporting IrDA data transmission can be either solely transmitting or solely receiving devices, or devices which are capable of both transmitting and receiving. All transmitting devices must, however, be able to determine whether there is other infrared data transmission on the go in the vicinity at the moment of transmission, because only one device is allowed to transmit at a time in the system.

If a device starting transmission detects another device also transmitting at that moment, the device waiting for the moment of transmission examines again after a while whether there is infrared data transmission on the go. When no other data transmission is detectable, the device waiting for transmission begins its own transmission.

The wireless communication devices presented in the system of FIG. 1 may contain very different features even though they all are telecommunication terminals. One wireless communication device may only contain basic features such as answering a call and call set-up. Another wireless communication device may also contain features such as sending and receiving text messages and other data features. A third wireless communication device may, in addition to telephone features also contain data processing features, such as calendar functions, notebook functions, or the like. With the help of a device identification method according to prior art, it is thus not possible to find out which wireless communication device type is in question, and thus some of the features of the wireless communication device may remain un-utilized when it is locally connected, for example, with a desktop computer or a lap-top computer. Another drawback in the systems according to prior art is that the identification data is not stored in the computer functioning as a host device, wherein this data always has to be defined when a device is connected in a data transmission connection with the host device.

One purpose of the present invention is to bring about a method for identifying an external device in a system which includes means for transmitting information between a host device and external devices. The method according to the present invention is primarily characterized in what will be presented in the characterizing part of the appended claim 1. The system according to the present invention is primarily characterized in what will be presented in the characterizing part of the appended claim 15. The external device according to the present invention is mainly characterized in what will be presented in the characterizing part of the appended claim 19. The invention is based on the idea that from external devices in the vicinity of the host device, additional information is accessed in order to determine the features of the wireless communication device, and a service packet is loaded in the host device, corresponding to the identified type of the external device and containing at least one service to control the functions of the external device.

With the present invention, considerable advantages are achieved compared with methods according to prior art and wireless communication devices. When using a method according to the invention, external devices in the vicinity of the host device, such as wireless communication devices, can be distinguished according to their features, wherein control modes best suitable for each device can be used in their control. In this way the features of the devices can be utilized better in a system in which it is possible to arrange external devices in a data transmission connection with a data processor, such as a computer. A method according to the invention enables updating the system with new identification methods according to the need, wherein the method is easily extendable. Furthermore, in the method, the features of the identified wireless communication devices can be stored, wherein different procedures can be performed for identified devices and new devices in the system.

In a system according to the invention, it is possible to load, for example the control software of a wireless communication device, if necessary, even by means of the global Internet information network directly from the server of the manufacturer, wherein it is always possible to retrieve the latest software suitable for the use of the wireless communication device in question. Thus, a program diskette, which would often contain an outdated program version, need not necessarily be supplied with the wireless communication device.

Figure 2:
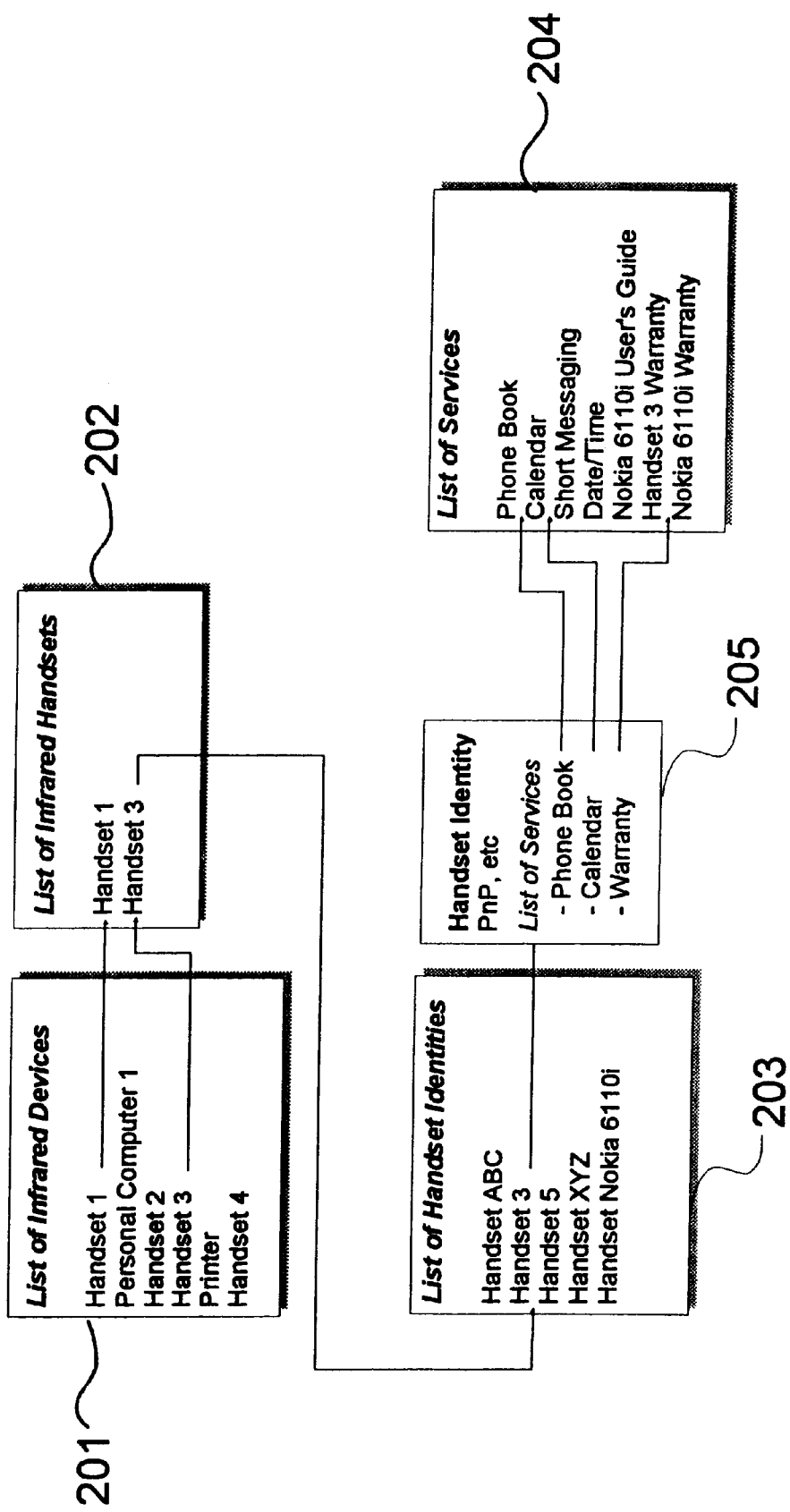
Figure 3:
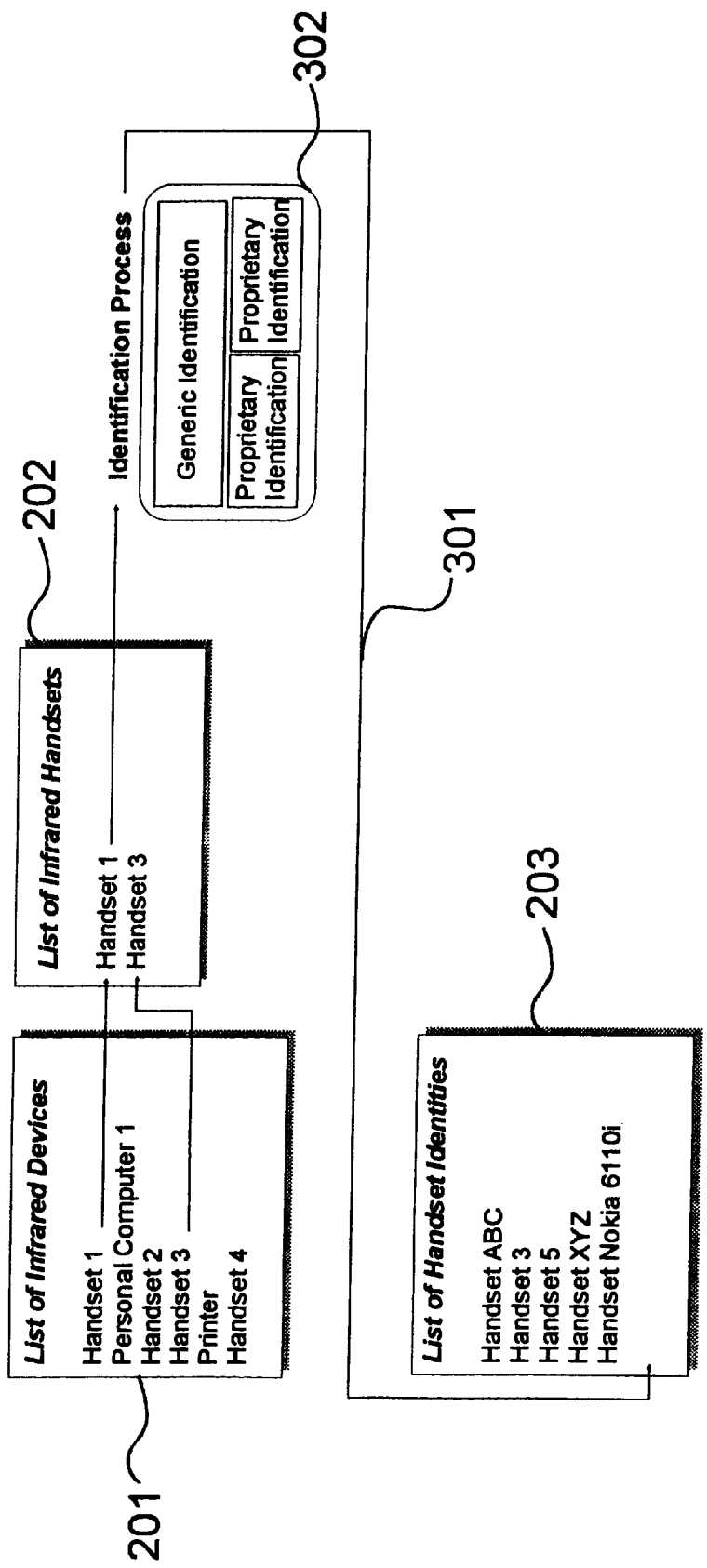
Figure 4:
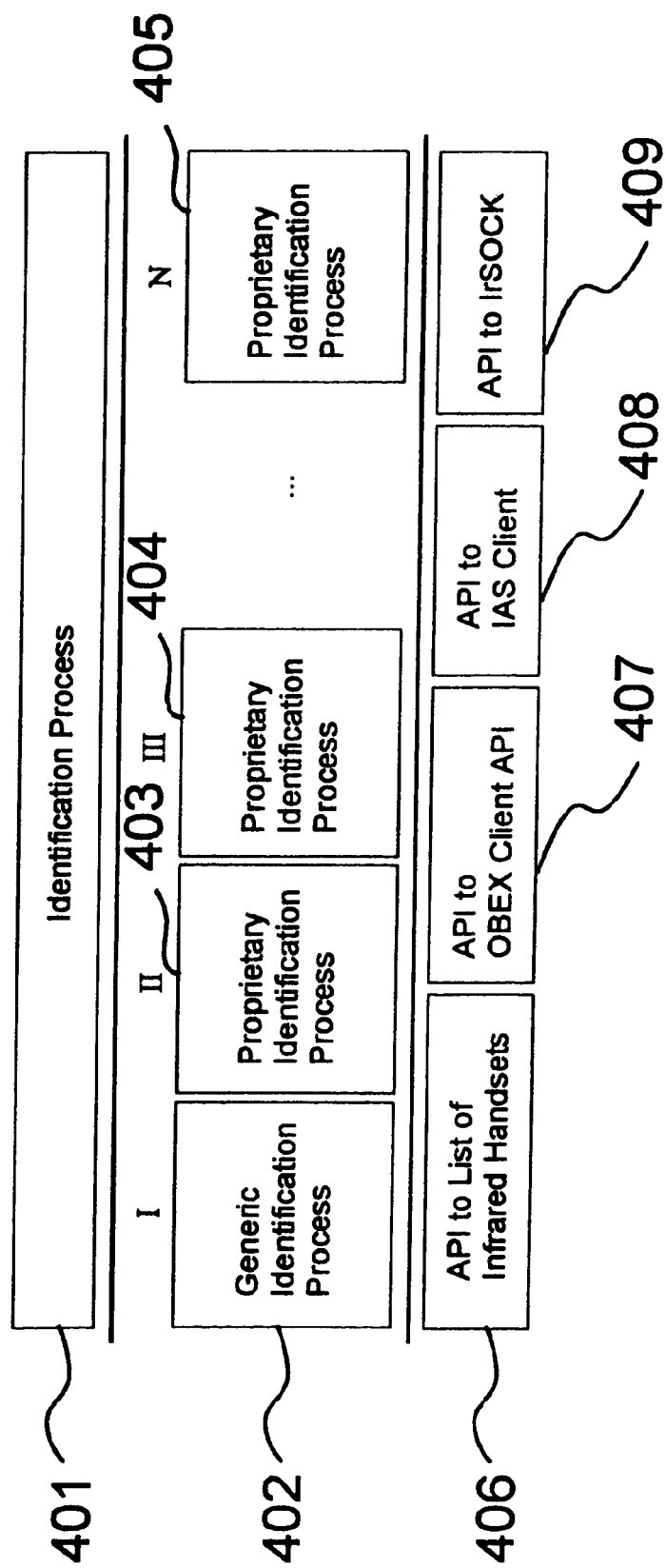
Figure 5A:
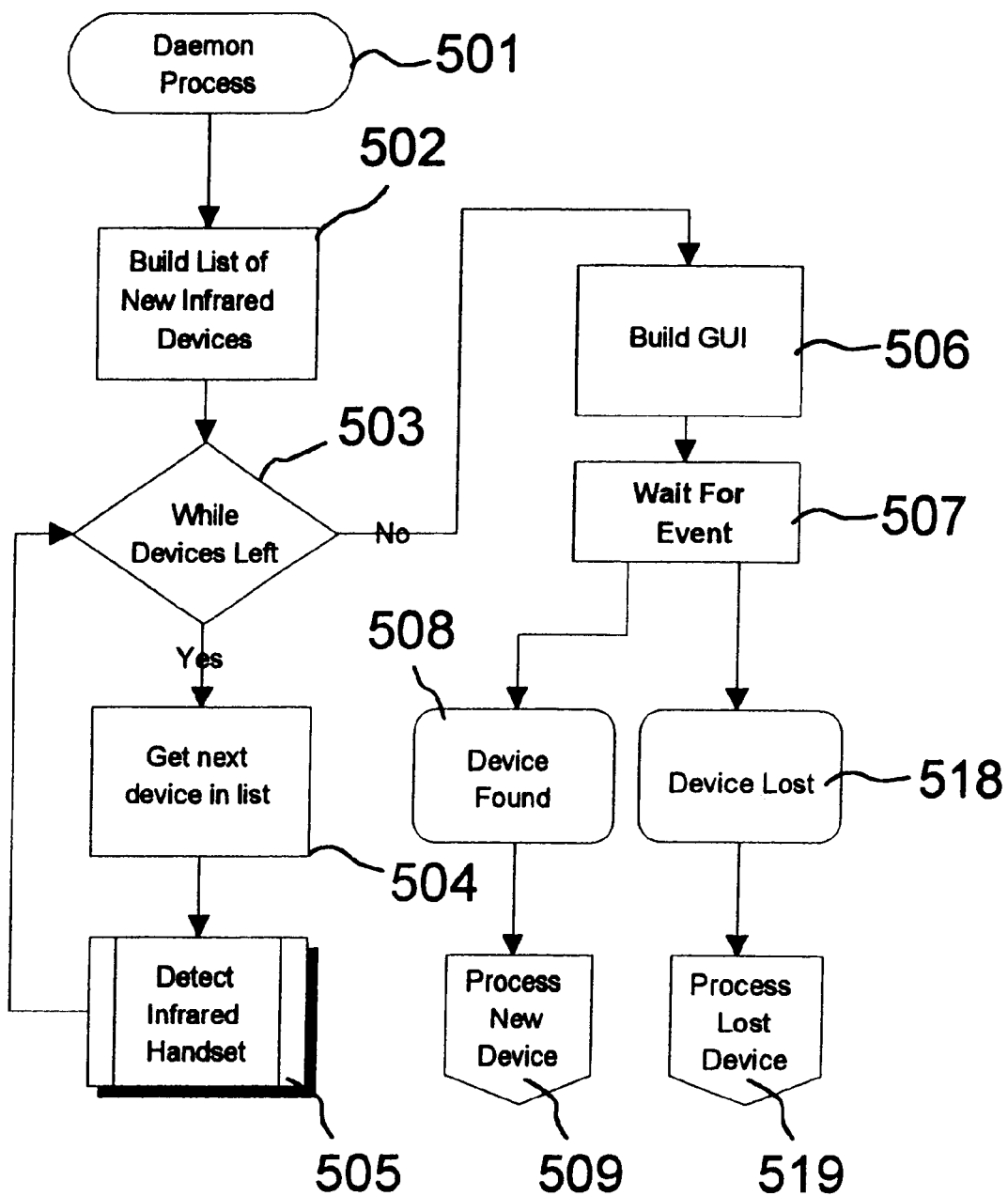
Figure 5B:
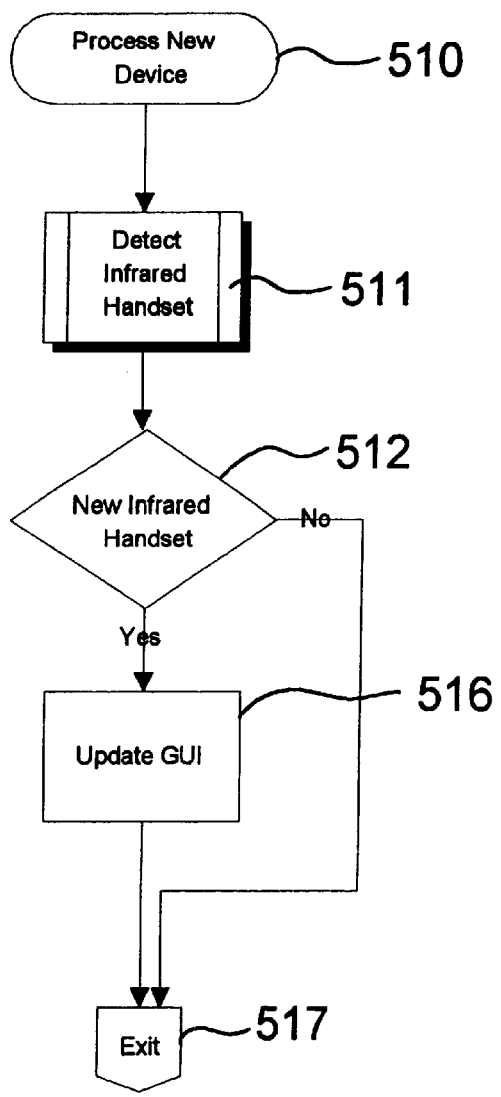
Figure 5C:
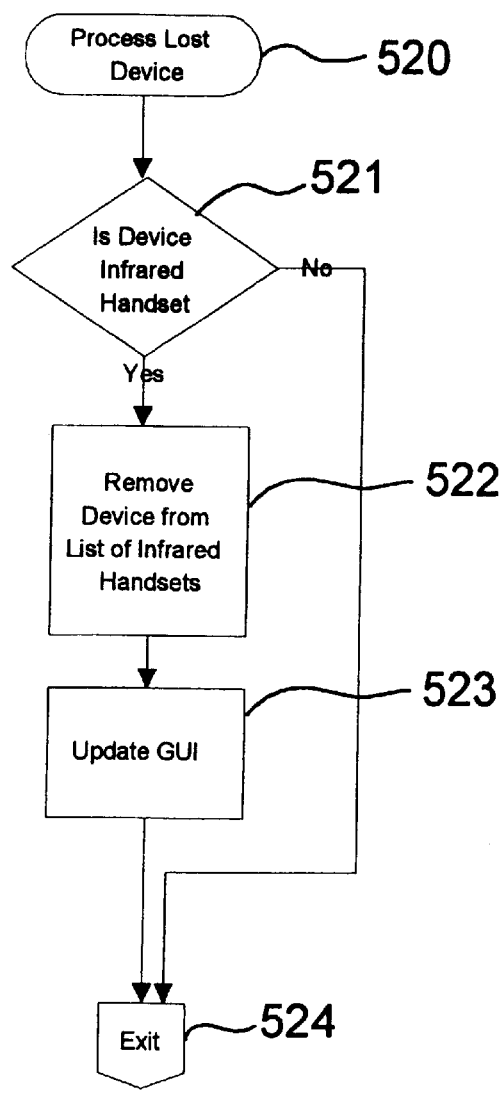
Figure 5D:
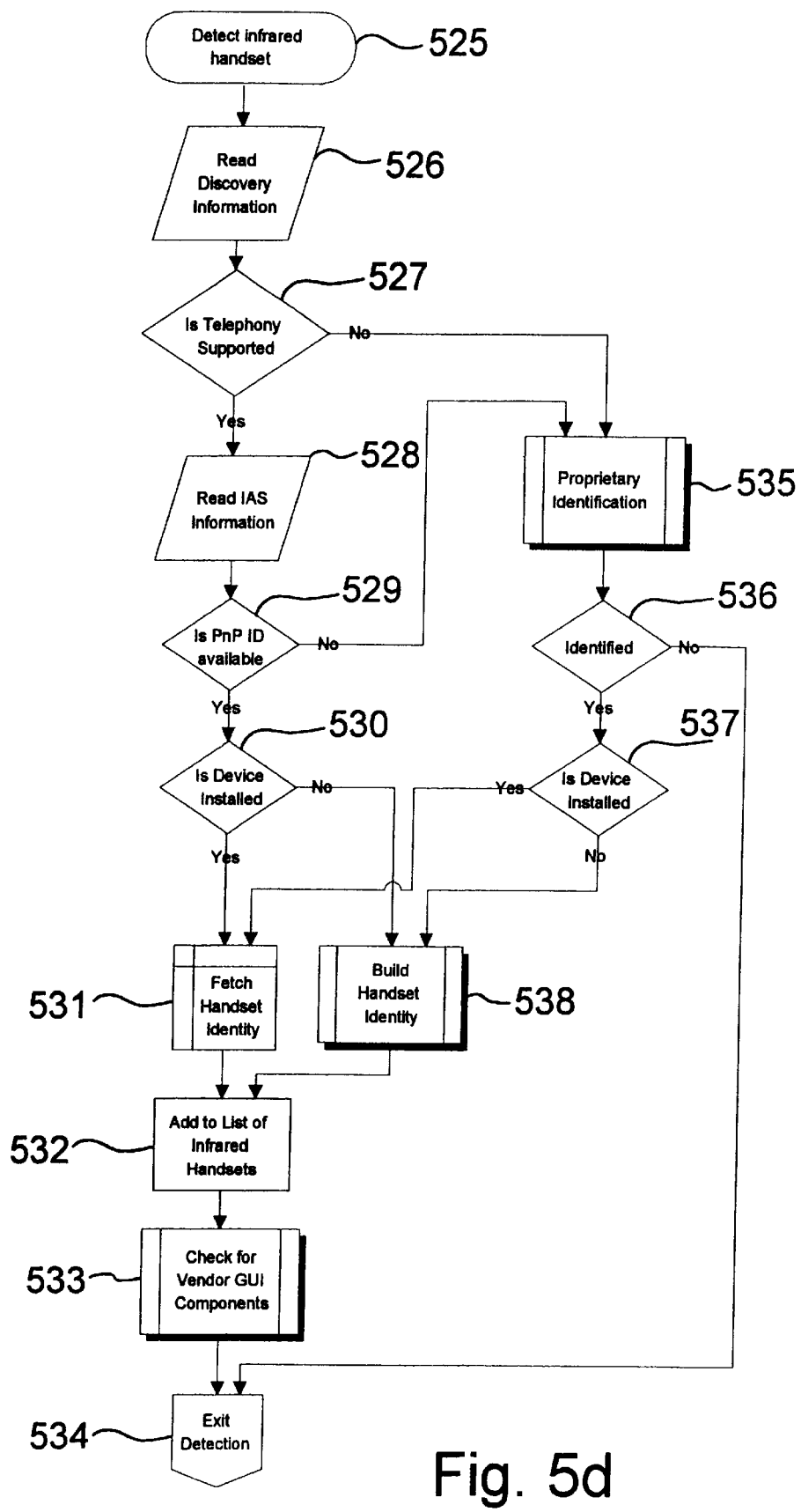
Figure 5E:
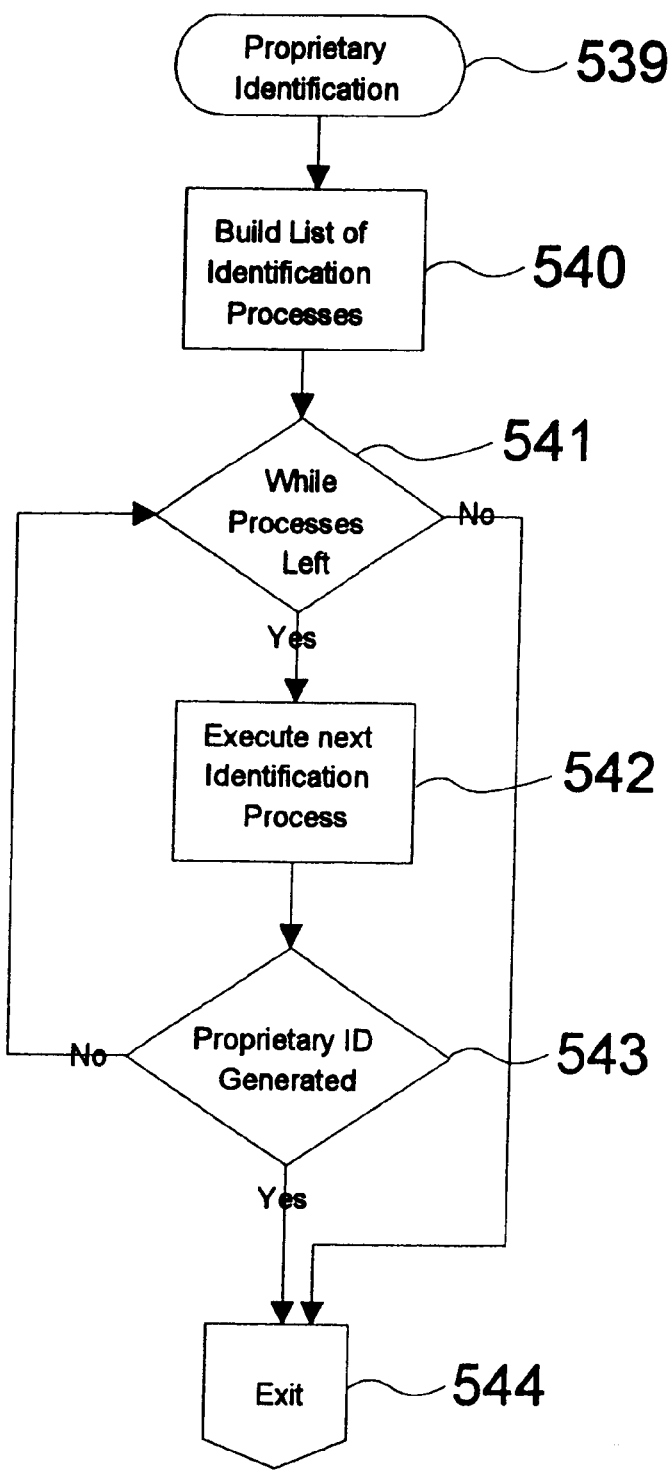
Figure 5F:
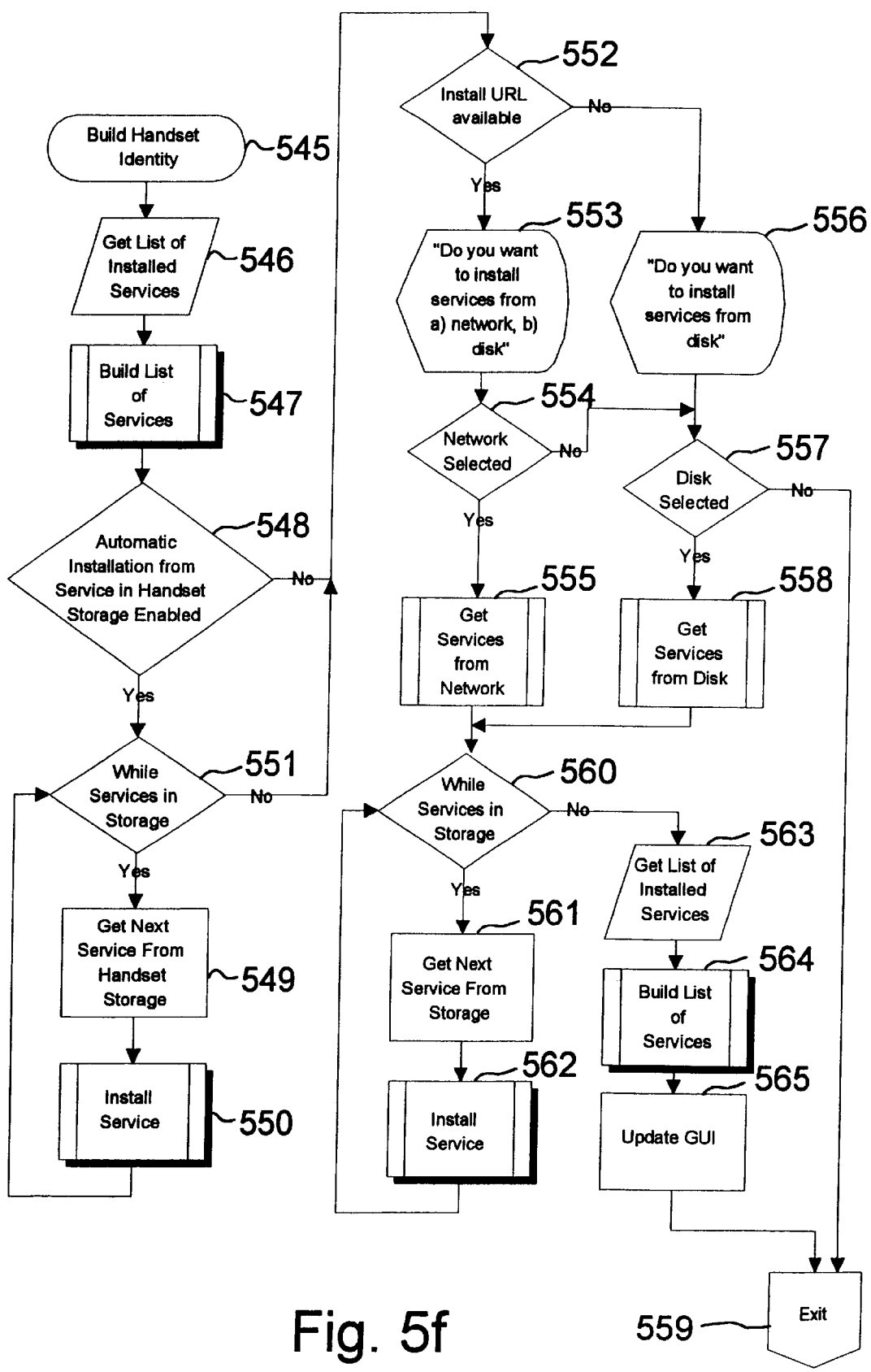
Figure 5G:
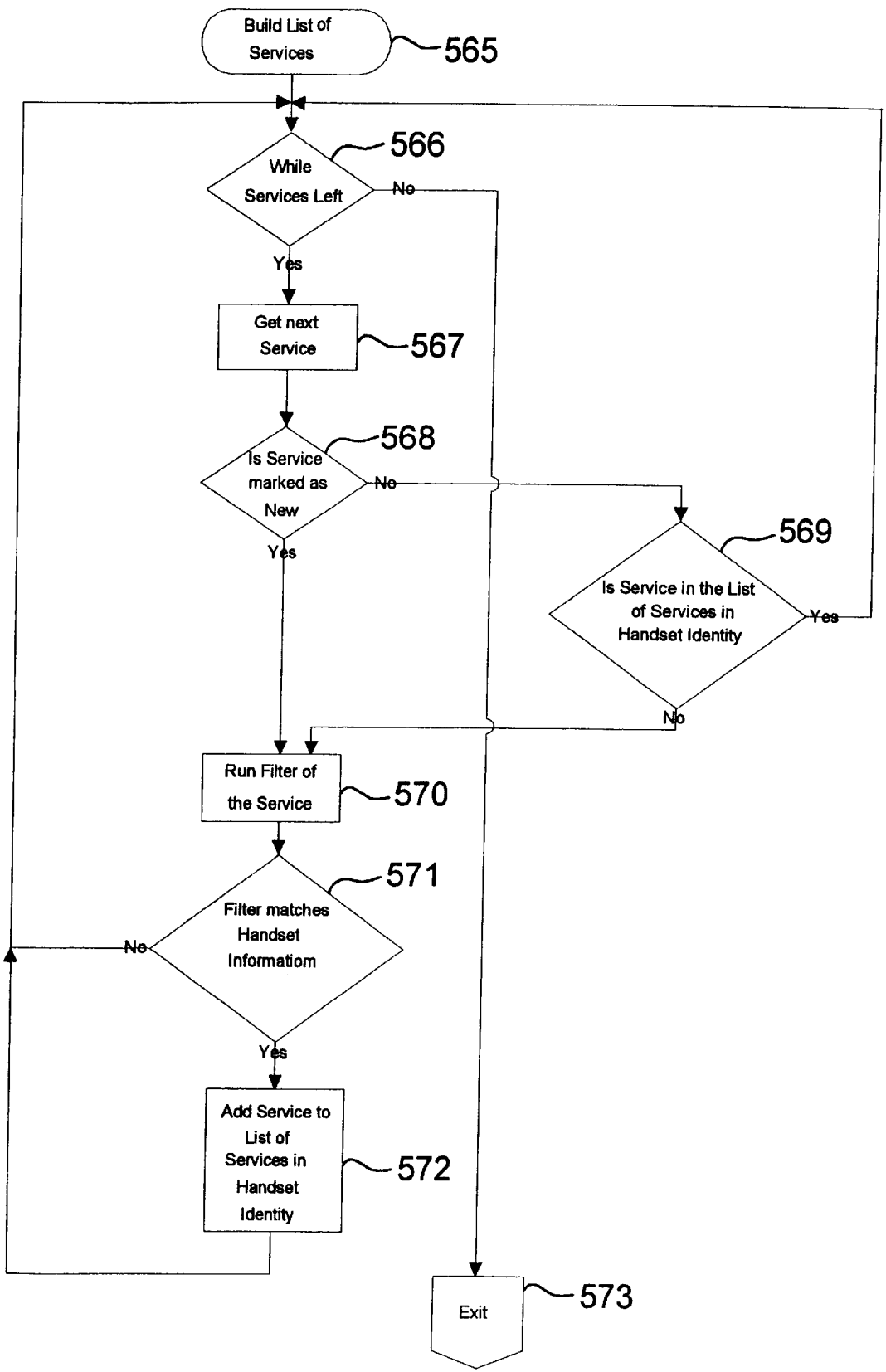
Figure 5H:
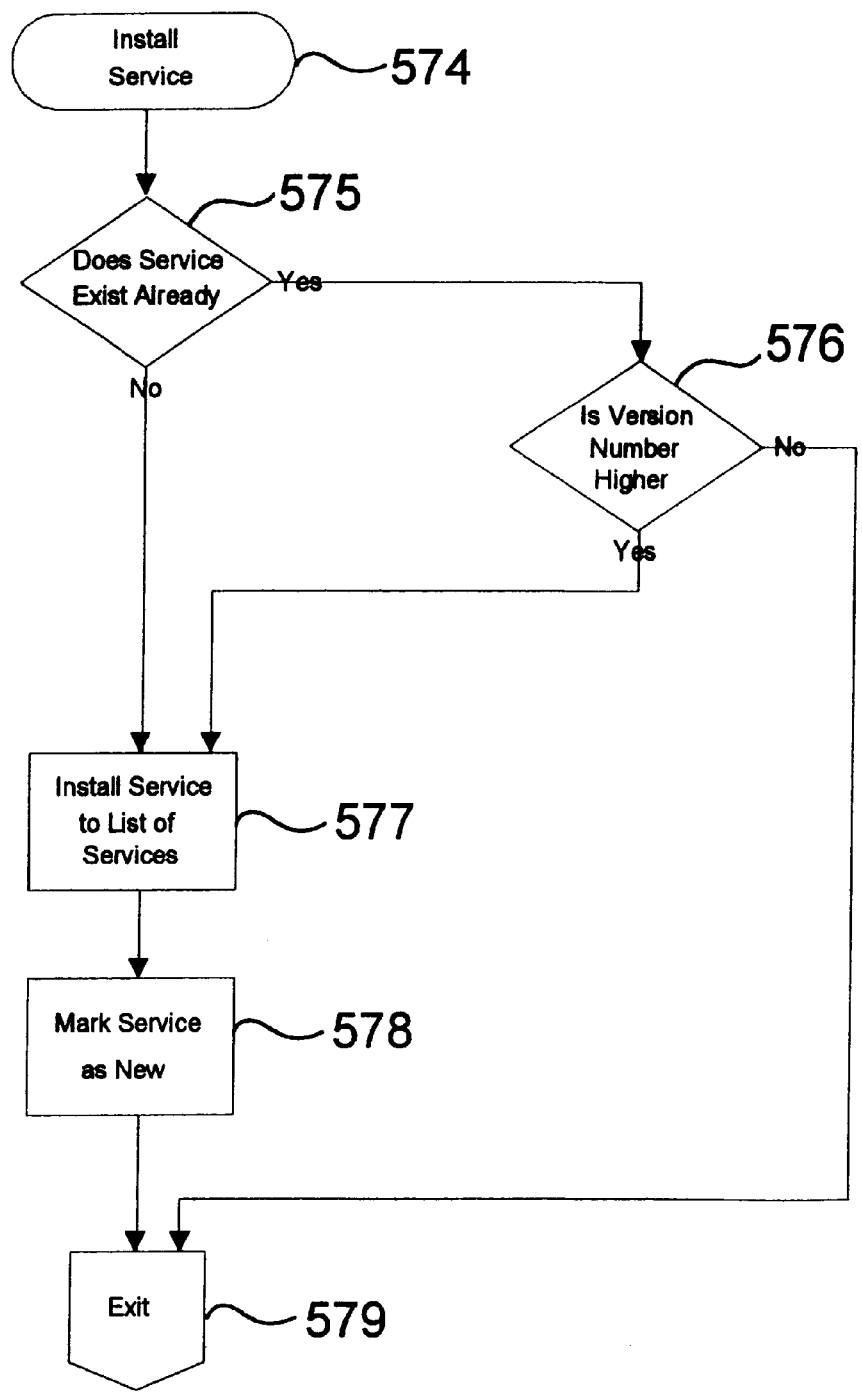
Figure 6A:
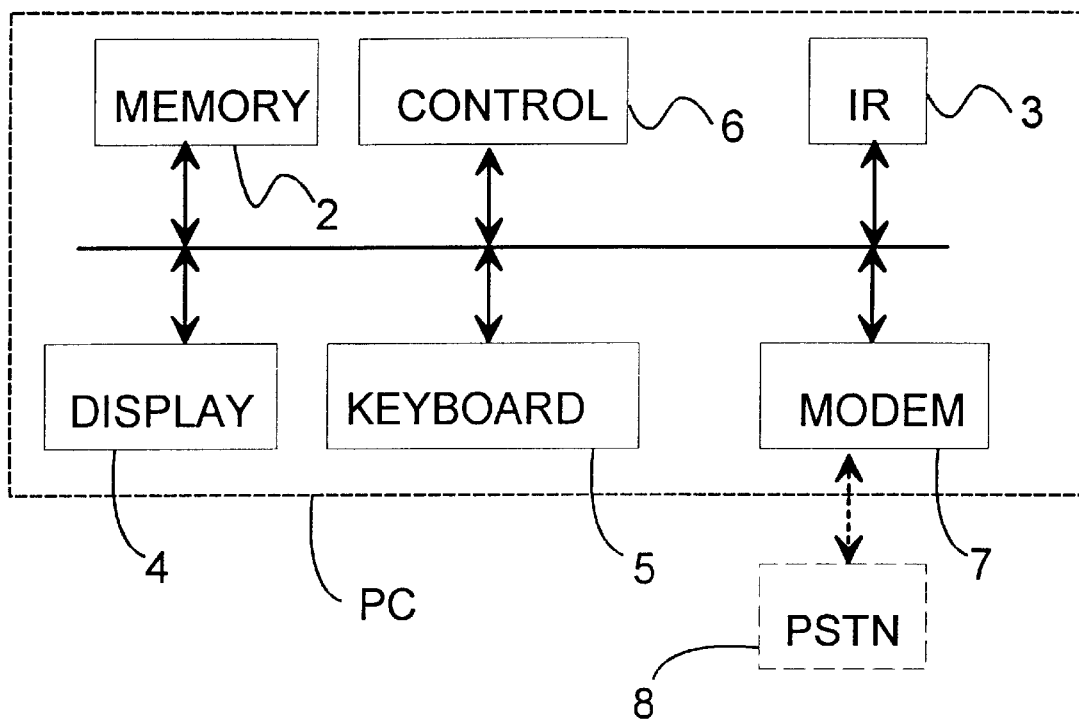
Figure 6B:
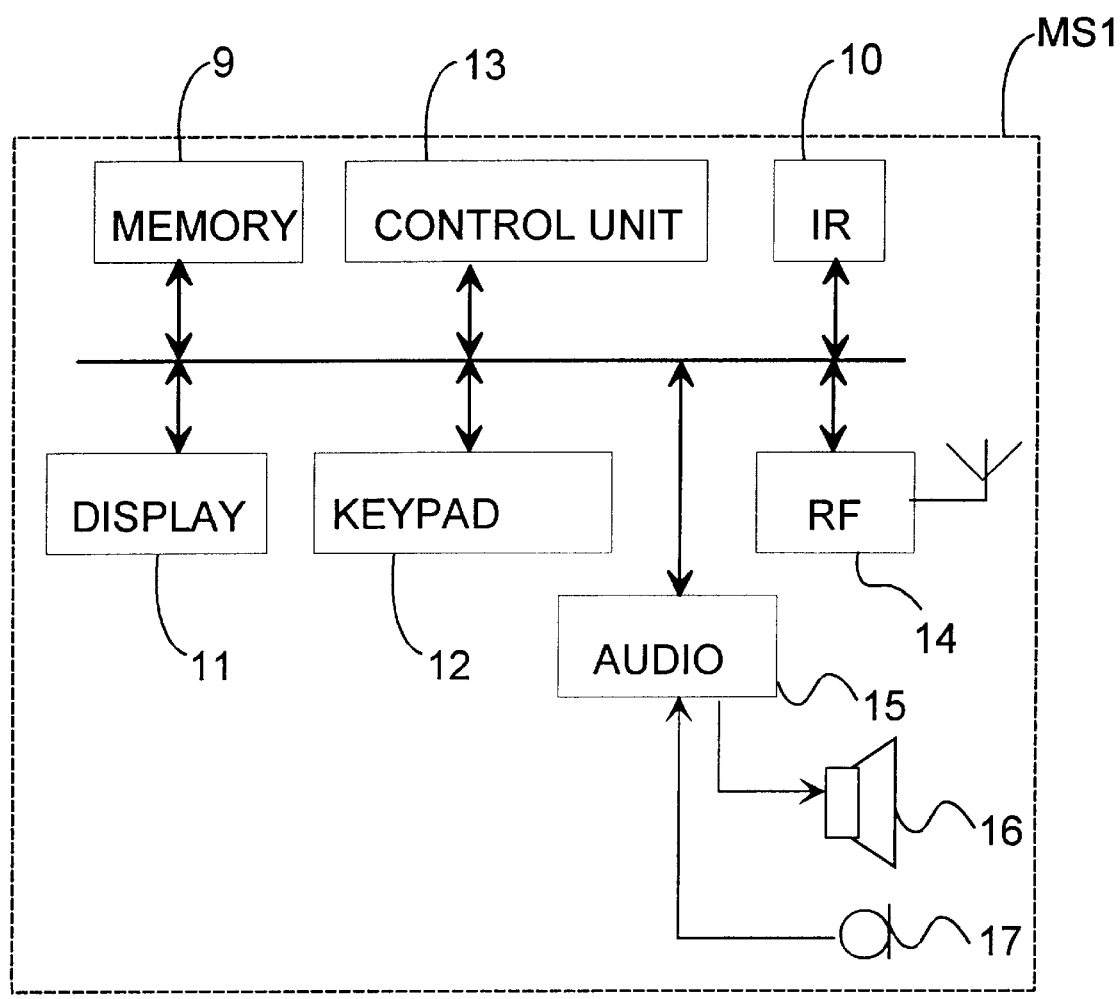
Figure 7:
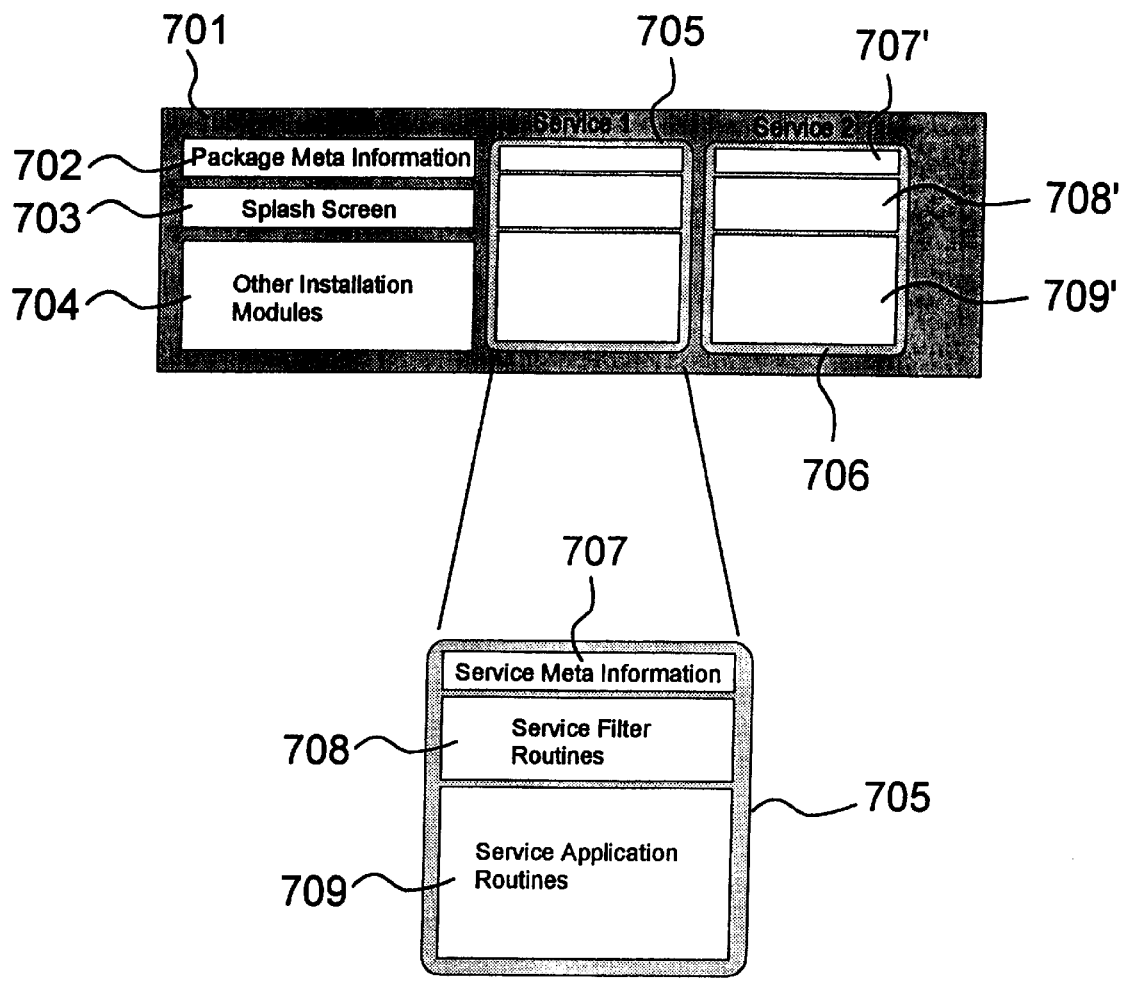

The invention will be described in more detail with reference to the appended figures, in which:

FIG. 1 shows a short distance data transmission system based on infrared data transmission, FIG. 2 is a diagram showing device information tabulating in a host device, FIG. 3 shows adding new device information to the identification table, FIG. 4 shows the principle of the identification process on the protocol layer, FIGS. 5a–5h show an identification method for devices in a flowchart, FIG. 6a shows a data processor in a reduced block diagram, FIG. 6b shows a wireless communication device in a reduced block diagram, and FIG. 7 shows a service packet for a wireless communication device In the following, the invention will be described by using infrared data transmission according to the IrDA standard as an example of the short distance data transmission system. Hereinbelow the term local area link will be used for this short distance data transmission system in this description. Correspondingly, the term data transmission means of the local area link will be used for the data transmission means implementing this local area link, which include, for instance, local area link transmitter and local area link receiver. It is obvious that the invention can also be applied by using other known data transmission methods, such as short distance radio data transmission (LPRF, Low Power RF), inductive data transmission or landline data transmission. A host device used within the scope of this invention can be a data processor, such as a computer, a wireless communication device, a printer etc. As an example of the external device, a wireless communication device, such as a mobile station according to the Global System for Mobile Communications GSM is used; however the invention is not solely restricted to wireless communication devices, but it is also applicable to be used in connection with other devices. In general, the invention presented in this description is suitable to be utilized in order to use the services of a second device from a first device.

In a system 1 in FIG. 1, the host device is a data processor PC, such as a personal computer, one preferred embodiment of which is presented in a simplified block diagram in FIG. 6a. This data processor PC contains storage means 2, such as a read only memory ROM, a random access memory RAM and a writeable mass storage (hard disc). In addition, the data processor PC contains data transmission means 3 of the local area link, in this case infrared data transmission means according to the IrDA standard, which comprise, for instance, a transmitter and a receiver. The data processor also includes a user interface UI which comprises a display 4 and a keyboard 5. To control the functions of the data processor, a control unit 6 is used, which typically contains a microprocessor CPU (Central Processing Unit), a microcontroller, or the like.

In the storage means 2 of the data processor PC, for example in a writeable mass storage, an operating system is installed, which contains program commands for accomplishing different functions in the data processor PC. With the help of this operating system, the user can start up application programs stored in the storage means 2 of the data processor PC, which is known as such. In the operating system, so-called device controllers are typically also loaded, by means of which it is possible to examine and read the pressings of the keys on keyboard 5, and to control other functional blocks of the data processor PC, for example the data transmission means 3 of the local area link and modem 7. With the help of the modem 7 the data processor can be coupled, for example, to a landline telecommunications network 8, wherein a data transmission connection can be established from the data processor to another, more distant data processor, for example, via Intenet communication network.

The system described in FIG. 1 presents also several wireless communication devices MS1, MS2, MS3. These wireless communication devices MS1, MS2, MS3 can be different, but they all contain certain basic blocks, on the basis of which the operation of this invention can be understood with respect to the wireless communication devices MS1, MS2, MS3. Even though in connection with a wireless communication device reference will be primarily made only to the first wireless communication device MS1, it is obvious that instead of this, also other wireless communication devices MS2, MS3 can be used.

FIG. 6b presents one preferred embodiment of a wireless communication device MS1 in a reduced block diagram. It includes storage means 9, such as read only memory and random access memory, and second local area link data transmission means 10, in this case infrared data transmission means according to the IrDA standard, which contain, for instance, a transmitter and a receiver. The wireless communication device MS1 also contains a user interface with a display 11 and a keypad 12. To control the functions of the wireless communication device MS1, MS2, MS3, a control unit 13 is used, which typically includes a microprocessor CPU (Central Processing Unit ), a microcontroller, or the like. In addition, FIG. 6b presents a radio unit 14 for setting up a data transmission connection to a mobile communication network (not shown) and means for processing audio signals such as an audio block 15, a receiver/speaker 16, and a microphone 17.

In the following, the identification of external devices in the vicinity of a data processor PC will be described. It is presumed that the data processor PC is turned on, and all the device controllers required are loaded in it, for instance for controlling the data transmission means 3 of the local area link. Thus, the local area link receiver monitors the communication of the local area link and when it detects communication, it receives the message and examines the contents of it. The received message advantageously causes an interruption in the controller 6 of the data processor, which after this moves on to execute the device controller program of the data transmission means 3 of the local area link. The device controller program informs the operating system that the processing program for the data transmission of the local area link will be started.

At this stage, the flowchart of FIG. 5a will be discusseds, showing how the external devices in the operating range of the local area link are identified in a system according to an advantageous embodiment of the invention. In a data processor PC, data transmission program 501 of the local area link is executed. First, the program generates a device table 201 (FIG. 2) of all the devices in the vicinity of the data processor PC, supporting the data transmission of the local area link, in this case infrared data transmission. Block 502 represents the formation of this device table 201 which is established in the storage means 2 of the data processor, preferably to the random access memory. The next step is to examine whether telecommunication terminals are included in the devices located in the device table 201. If all devices have not been identified yet, the system proceeds to block 504, in which the name of the next device or another identification of the device is accessed from the device table 201, and by executing an identification program or the like (block 505), it is determined whether this device is a wireless telecommunication terminal. The wireless communication devices are compiled into another table, which in this description.will be called telephone table and indicated with the reference number 202 (FIG. 2). All devices marked in the device table 201 are subjected to this stage. In block 503, it is examined whether the device table still includes devices whose type has not been examined. After the identification stage, the system proceeds to block 506, in which a graphical user interface (GUI) is established on the display 4 of the data processor PC. After this, the telecommunications program remains in a wait state, in other words, is waiting for the data transmission of the local area link. This is presented in block 507 in the block diagram of FIG. 5a. As is obvious for a man skilled in the art, in this wait state the data processor PC can execute other running applications and operating system functions.

FIG. 2 presents as an example a device table 201, established on the basis of the system according to FIG. 1 in a data processor PC, in which the labels of the devices detected by the data processor PC are stored, which are presented here with names "handset 1", "personal computer 1", "handset 2", etc. "Handset 1", "handset 2"are telecommunication terminals, preferably wireless communication devices. The device table 201 gives also information on the printer "printer" and second data processor "personal computer 1". Thus, this device table 201 contains the information of such devices which have been detected and identified by the data processor PC. The telephone table 202 in which information on the wireless communication devices such as "handset 1", "handset 3" is collected, is also stored preferably in the storage means 2 of the data processor PC.

The telephone table 202 contains a reference to the wireless communication devices identification table 203 which contains more detailed information on each wireless communication device. Thus a line in the telephone table 202, for example, "handset 3" refers to the corresponding line in the identification table 203, in which the name is "handset 3". In this table, a record is set for each wireless communication device type, which in addition to the said name includes other identification data, for example Plug-and-Play Identity PnP ID and other automatic identification information, make and model information of the device, manufacturer information, the number and/or date of the software version, the number and/or date of the hardware version of the device, the version number and/or date of the application software of the device, the name of the device and fields defined by the manufacturer which can vary between different manufacturers and devices. This manufacturer-specific information is advantageously obtained on the basis of a manufacturer-specific identification which will be described below in this explanation.

In the following, a situation in which a new device is introduced in the vicinity of the data processor PC will be described. Thus the data processor PC detects a message sent by a device and on the basis of that examines whether the device in question is stored in the device table 201 (blocks 508 and 509). In FIG. 5b, the identification process of the device begins from the block 510. A query message is transmitted from the data processor PC to the devices. The device which has received the message, sends a reply, in which the device reports identification data. With one query message, the identification data transmitted by several devices can be defined, wherein each device transmits the information at different times, as presented earlier in this description. The reply message contains, according to the IrDA standard, information on the address of the device, which in this standard contains 32 bits. This address information can vary in different applications, and each device should have a different address. This address can also be given in connection with this identification stage, wherein preferably the data processor PC defines the address and transmits the address information to the device in question. The reply message also contains information on the services supported by the device, in a field containing a few state variables. These state variables can, for example, report whether the device in question is a telecopier, modem, telephone, Personal Digital Assistant (PDA), printer, etc. In the reply message, also a name has been set for the device, which the user has stored in the storage means of the device. The name is typically a character string. The received information is stored in the data processor PC in the identification table 203. In FIG. 3, an arrow 301 illustrates how the information of a new device is added to the identification table 203 in connection with the identification process (indicated with reference number 302 in FIG. 3). In block 512, it is examined whether it is a previously unidentified wireless communication device MS1 in question, whereby the graphic user interface is updated on the display 4 of the data processor. This updating (block 516) includes, for example, adding a new icon on the display 4. The next step is to exit the identification process of the new device (block 517) and to move into a wait state in block 507.

If a device is switched off or taken outside the operating range of the local area link, the device is deactivated in the data processor PC, in other words the device is removed from the set of usable devices. This stage is presented in FIG. 5a in blocks 518 and 519, in order to perform the deactivation process of the device in FIG. 5c (block 520). First of all, in block 521 it is examined whether the deactivated device was a wireless communication device MS1 comprising a local area link, in which case the identification of the wireless communication device in question is deleted from the telephone table 202 (block 522). After that the graphical user interface of the data processor PC is updated, for instance, by removing the icon of this wireless communication device from the display 4. If the deactivated device was not a wireless communication device MS1 or a wireless communication device with local area link features, the deactivation process is merely exited at this stage (block 524).

The block diagram in FIG. 5d presents in more detail the identification process of a wireless communication device with local area link features which in the block diagram of FIG. 5b is presented in one block 511. The identification process (block 525) first reads the identification data in block 526. From the identification data a telecommunication terminal state variable is examined, which indicates whether the device in question contains telephone features (block 527). If the device in question has telephone features, the features of the device are defined in more detail. This can be performed for example by reading device information from a database stored in the device (block 528). The database is for example a database according to the Information Access Service (IAS). On the basis of this information it is examined whether automatic identification is usable in the device, which can be concluded from whether the plug-and-play identity PnP ID is included in the identification data (block 529). If such an identification is found, the next step (block 530) is to examine whether the information on the device in question has been stored at an earlier stage in the identification table 203. If such information is found in the identification table 203, the information of the device is read from this identification table 203 (block 531) and the identification of the device in question, for example "handset 3", is added to the telephone table 202 (block 532). In the end of the identification process, it is examined whether the storage means 2 of the data processor PC contains a graphic icon or the like, determined by the manufacturer of the device in question, which can thus be added on the display 4 of the data processor PC (block 533). Reference is made in this context to the parallel application by the applicant, in which this process of adding a graphic icon is described in more detail.

If the device in question does not support automatic identification or the state variables indicate that the device does not support telephone features, the examination is continued with the help of, manufacturer-specific identification procedures. FIG. 4 presents some processes of this kind, which can be run one by one for as long as the device is identified or all the manufacturer-specific identification processes stored in the data processor PC have been run. If it is possible to identify the device (block 536), it is examined whether the device has been previously installed, i.e. whether its information is stored in the storage means 2 (block 537). On the basis of this the operation continues either from the above described block 531 or from block 538, from which the operation proceeds to the search of the device information and services, which will be presented below in the description beginning from block 545. The execution of the identification process ends in block 534, after which the next step is to move to block 512 in FIG. 5b.

Manufacturer-specific identification (block 535 in FIG. 5d) is presented in more detail in the block diagram of FIG. 5e. The identification process (block 539) produces a list of the identification processes available (block 540). If the executed identification process returns the identification data (proprietary ID, block 543), in other words the device was identified, the next step is to exit the manufacturer-specific identification process (block 544) and move on to block 536 in FIG. 5d. If the device is not identified, another-attempt will be made by means of the next identification process (block 542), if there still are unexecuted identification processes available for the data processor PC (block 541).

These device-specific identification processes can be dynamically expanded, in other words new, manufacturer-specific identification processes can be added in the data processor PC according to the need. These identification processes can be based on Information Access Service IAS, Object Exchange database (OBEX), manufacturer-specific data transmission methods, such as the use of a fast bus (FBus). The Object Exchange database OBEX is a data transmission method similar to the HTTP protocol known from the Internet, for moving objects between client services and server services.

In the identification, comparisons can be made between the information received from already identified devices and the information received from a device under identification, in order to detect possible similarities. The database possibly used in the identification can be stored in the device under examination, or in a separate data processor, such as a server computer connected to the Internet information network, or the like.

In the description of the protocol layer in FIG. 4, this identification process comprises a first interface 401, from which the next step is typically to start executing a generic identification process 402. FIG. 4 also presents manufacturer-specific identification processes 403, 404, 405, the number of which can vary and which can be updated in newer versions. There are Application Programming Interfaces (API) from these identification processes for using different information access methods. FIG. 4 presents four such application programming interfaces 406–409. The first application programming interface 406 is intended for defining the information in the telephone table 202. The second application programming interface 407 is a connection interface to the OBEX database, wherein it is possible to examine the OBEX objects possibly stored in the device under examination can be examined. The third application programming interface 408 is an IAS database interface, wherein the IAS information possibly stored in the device under examination can be examined. The fourth application programming interface 409 is an interface connected with IrDa services.

Consequently, the identification proceeds from the layers of FIG. 4 from top to bottom to the application programming interfaces. The identification process returns either a reference to an existing record, a new record, or a message that the identification has failed. If the identification process returned a reference to an existing record, this means that the device in question is a wireless communication device MS1, with local area link features available and that it has been identified earlier. If the identification process returned a new record, the device in question has not been identified earlier, but it is, however, a wireless communication device MS1 with local link features available. Thus the identification process can define a plug-and-play identity PnP ID, or a temporary ID which can be used as a reference to this identification record. If the identification process returns a message of unsuccessful identification, it means that the device in question either is not a wireless communication device MS1 with local area link features, or the identification process of the device in question has not been installed in the data processor PC. In that case the user can advantageously be given the possibility to select one of the existing device types, or a new manufacturer-specific identification program can be installed in the storage means 2 of the data processor PC. This identification process can be accessed, for example through the Internet information network from the home page of the manufacturer or it can be loaded from a diskette or CD ROM.

Next, we shall describe the stage following the identification stage, i e. loading the service packets of a wireless communication device. At this stage, a service packet which is suitable for controlling a wireless communication device and in which the special features of the wireless communication device are taken into account, is loaded in the data processor PC. This service packet contains information on the services of the wireless communication devices and the application programs required for using these services. The service packet is typically produced by or for the manufacturer of the wireless communication device, and it can vary on the basis of the features of the wireless communication device. This process of loading the service packet utilizes the information on the features of the wireless communication device given by the identification.process. It is possible to load this service packet from various sources of information. The service packet can be stored, for example, in the storage means 9 of the wireless communication device, whereby it can be transferred by means of the local area link to the storage means 2 of the data processor PC. The service packet can also be loaded from a diskette, a CD ROM, a local area network or even from the Internet information network. Thus, with the help of an icon formed on the display 4 of the data processor in connection with the identification process, the user can start up an application program related to the service included in the service packet. By means of the functions included in the application program, the user can thus control said wireless communication device and the functions contained therein, for instance call set-up. The call, can be set up from the data processor PC, wherein the user dials the telephone number by using the keyboard 5. The application program transmits this telephone number and possibly also other necessary control data through local area link from the data processor PC to the said wireless communication device. This wireless communication device MS1 starts the call set-up in a way known as such. Answering the call can also be performed by following the corresponding principles.

FIG. 7 shows, in a basic view one advantageous service packet 701. It contains a basic data field 702 for the packet, including a version of the service packet 701, the languages available, the production date and the manufacturer. The installation data field 703 contains a loading image for the service packet, which the data processor PC can form on the display 4 for the time of the installation of the service packet. In addition, the service packet 701 in FIG. 7 contains the services 704, 705, 706. The first service in this example is a so-called installation module 704, which includes other information, which is not directly connected with a particular service 704, 705, 706 in the service packet 701. This information included in the installation module 704 can be for example a modem controller installation program or a printer controller. The other services 705, 706 in the service packet presented in FIG. 7 contain advantageously a basic data field 707, 707' for the service, service filter programs 708, 708', and service application programs 709, 709'. The basic data field contains, for example, registration information and other information necessary for the use of the service in question. The filter programs 708, 708' are used for checking the access rights and other such information of the service before the service is installed. The application programs are programs intended for executing the operations of the service.

The loading of a service packet is described in the enclosed flowcharts in FIGS. 5f–5h. The flowchart in FIG. 5f illustrates the loading of the service packets required for the use of services supported by the wireless communication device MS1 (block 545). When loading a service packet, it is possible to use, for example, the identification data of the wireless communication device MS1 from the identification stage, such as plug-and-play-identity PnP ID or the manufacturer and device information of the wireless communication device MS1, such as "Nokia 6110i". On the basis of the identification data of the wireless communication device MS1, it still remains to be examined where the service packet for the wireless communication device MS1 type in question can be accessed. This can be performed advantageously by starting the search on the basis of manufacturer information and specifying the search with model and version information.

One alternative to define the loading information of the service packet is that a reference (a path) is stored in the wireless communication device, on the basis of which it is possible to retrieve the service packet. The reference is, for example, a so-called URL address (Universal Resource Locator) or a file address according to the index sequential organization of the writeable mass storage of the data processor PC. On the basis of the reference data, the data processor PC can access the service packet. This access of the service packet or service programs can be done automatically, advantageously at the stage when the wireless communication device MSI is for the first time in the operating range of the local area link of the data processor PC. The access can also be done manually, started up by the user. This alternative has the advantage that it is not necessary at the identification stage to determine the type of the wireless communication device MS1, but this can be determined from the service packet accessed on the basis of this reference data.

At the next stage, it is defined what services are available in the wireless communication device MS1 in question. The external device service table 205 and the data processor service table 204 are utilized here. In addition to the data processor service table 204, for each wireless communication device in the operating range of the local area link, a service table 205 is installed advantageously in the storage means 2. If the wireless communication device MS1 is new, i.e. previously unidentified in this local area link, a separate external device service table 205 is compiled for it, and the wireless communication device information is added in the telephone table 202. The service table 205 contains information on the services available in this wireless communication device MS1. Correspondingly, the service table 204 of the data processor indicates what are the services for which the service packets are installed in the data processor PC.

Updating the external device service table 205 advantageously: consists of the following stages. At the first stage, the service table 204 of the data processor PC is accessed for processing (block 546). This can be done in way known as such, that in the program code of the control unit of the data processor PC, a read out pointer address is set to be the starting point of the service table 204 in the storage means 2. In the data processor PC, it is examined which of the services stored in the service table 204 are usable in the wireless communication device MS1 under examination at given times, and the identifications of these services are stored in the external device service table 205 (block 547). This stage of updating the external device service table 205 is presented in more detail in the flowchart of FIG. 5g, which will be described below in this description.

In the next phase, the data processor PC examines the information access service database IAS of the wireless communication device MS1. This IAS database first contains information whether automatic service packet installation is allowed in the wireless communication device MS1 in question (block 548). The enclosed Table 1 presents one preferred example of the IAS database. The first line of the Table 1 contains automatic updating enabling information, and the next lines contain references to the access locations of different services. On each line, the first value indicates the service class and the attribute, the second column indicates the type of the information, and the third column contains a short description on the meaning of the information. On each line in Table 1 the service class is "IrDA:TELECOM", which here indicates a device equipped with telephone and infrared data transmission features. The attribute on the first line is "Win:ServiceInstall", i.e. the automatic loading enabling information of the programs suitable for the Windows® operating system developed by Microsoft Corporation. The Windows® operating system can be Win95, Win98, Windows NT 4.0 or Windows NT 5.0. The operating system can also be an OS/2 operating system (by IBM Corporation) or a Psion operating system. The type of this is an integer and it can obtain values 0 or 1. For example, with the value 1 automatic loading is allowed. If this value is neither of the aforementioned or the information in question does not exist in the IAS database of the wireless communication device MS1, loading is not allowed or the wireless communication device MS1 in question does not contain these auxiliary service loading features.

On the next lines, the attribute refers to loading addresses of different types. The type of these is a character string definable by the user (USRSTR). The first reference is a URL address to the Internet information network, the second is a reference to an OBEX object, the third is a reference to a file on a diskette, and the fourth is a reference to a file stored in the local area network.

TABLE 1

| Class, attribute | Type | Description |
|---|---|---|
| "IrDA:TELECOM", "Win:ServiceInstall" | INTEGER:0,1 | Automatic loading blocked/allowed |
| "IrDA:TELECOM", "Win:ServicePath:URL" | USRSTR | WWW URL |
| "IrDA:TELECOM", "Win:ServicePath:OBEX" | USRSTR | OBEX object name |
| "IrDA:TELECOM", "Win:ServicePath:DISK" | USRSTR | Path+file name |
| "IrDA:TELECOM", "Win:ServicePath:LAN" | USRSTR | Local area network path+file name |

The database of the wireless communication device MS1 does not necessarily contain all the references presented in Table 1, or it can also contain references to other data access locations. If the database of the wireless communication device MS1 contains several references, it is possible to select in the data processor PC which reference is used, or the user can be allowed to make the selection. Loading the service packet from the OBEX server of the wireless communication device MS1 differs from the other addresses presented in Table 1 primarily in that the service packet can be accessed directly from the wireless communication device preferably via the local area link. Thus the service packet connected to the service is automatically loaded (block 549) in the storage means 2 of the data processor, from where the service packet is installed in the operating system of the data processor PC (block 550). After all the service packets are loaded and installed (block 551), the next step is to examine in block 552 whether a URL address is defined in the database of the wireless communication device MS1. If the database contains a URL address, a message is generated on the display 4 of the data processor PC, in which the user is asked whether service packets are to be loaded from the information network or from a diskette (block 553). If the user selects the information network (block 554), the service packet is accessed from the information network, for example, from the Internet information network (block 555). This loading can be conducted from the data processor PC, for example with an Internet browser program. If the data processor PC contains a local area network connection card or a connection arranged in some other way with the local area network connection card and via that with the Internet information network, it is thus not necessary to establish a separate connection with the Internet information network. Otherwise the data transmission connection is established advantageously via a modem 7 and a landline telecommunication network or via the wireless communication device MS1 and a mobile communication network (not presented) to a location defined by the URL address, for example, to a server of the manufacturer of the wireless communication device MS1, from which service packets can be accessed. Before setting up a connection, it can still be ascertained from the user whether the information is to be accessed. This confirmation may be necessary, because in this case the use of telecommunication network or mobile communication network may cause extra costs for the user.

If there is no URL address available, the user is asked whether service packets are to beloaded from a diskette (block 556). If in block 554 or 556 above, the user selected the diskette (block 557), the user is asked, if necessary, to insert the diskette in the corresponding disk drive of the data processor (not presented) and the service packets are retrieved from the diskette (block 558). Otherwise, the next stage is to exit the loading program of the service packets (block 559). It is obvious that in this context the term diskette also includes CD ROM, FLASH-memory and other as such well known data storage disks and tapes, which need not be discussed in more detail in this context.

After the service packets of the services are fetched from the selected location into the storage means 2 of the data processor, they are installed in the operating system. These stages are illustrated by blocks 560, 562 and 562. The actual installation is described in more detail in the flowchart 574 of FIG. 5h. At first, it is examined whether-the service being installed has already been installed earlier (block 575). If it has already been installed, the version information of the installed service is compared with the version information of the service which is being presently installed (block 576). If the service which is being installed is new or the comparison shows that the version of the service being installed is newer than the previously installed corresponding service, this service is installed in block 577, so that the information of the service is added to the service table 204 of the data processor. After this, the service is marked as a new service (block 578) and the installation program is terminated (block 579).

After the loaded services are installed, the external device service table 205 is updated on the basis of the installed services (blocks 563,564). The updating is conducted advantageously as presented in the flowchart of FIG. 5g (blocks 565 to 573). From the data processor service table 204 information on one service is accessed (block 567) and it is examined whether the service in question is new (block 568), in other words it was added to the data processor service table 204 in connection with the aforementioned stages. If the service is not new, it is examined in block 569 whether the service in question already exists in the external device service table 205 and if it does, a corresponding examination is conducted for the next service in the data processor service table 204. However, if the service is new, or the service has not been entered in the external device service table 205 yet, the service can be added directly to the external device service table 205, or a so-called filtering stage is executed (block 570). The filtering stage returns the information (block 571) on whether the service in question is to be installed in the service table 205 of this external device (block 572) or to remain uninstalled. After this, it is examined whether there are still unexamined services in service table 204 of the data processor (block 566), and if there are, the operation is continued from the block 567. After all the services in the service table 204 of the data processor are examined, the final step is to exit the updating stage (block 573).

After this, the graphical user interface is updated by forming icons of the service packets on the display 4 (block 565). The services of each wireless communication device MS1 are preferably grouped in separate groups, in which each service of the wireless communication device MS1 is indicated by an icon of its own. Thus the user can activate the group of desired-wireless communication device MS1 and from this group select the service to be started.

The enclosed Table 2 presents another preferred example of the IAS database, from which it becomes apparent that the device in question can also be of another, type than a device containing telephone features. The first line in Table 2 contains information on automatic updating enabling, the second line contains a description of the information contained in the database in question, and the following lines contain references to the search locations of different services. On each line, the first value indicates the service class and the attribute, the second column indicates the information type and the third line contains a brief description on the meaning of the information. On each line in Table 2, the service class is "IrDA:Install" which here signifies installation information for a device with infrared data transmission features. The attribute on the first line is "Win:ServiceInstall" and the type is an integer which can obtain values 0 or 1. For example, with the value 1 automatic loading is allowed. If this value is neither of the afore-mentioned or the information in question does not exist in the IAS database of the device MS3, loading is not allowed, or the device in question. MS1 does not include these loading features of auxiliary services.

On the second line the description of the information included in the database indicates, for example, what is included in the service packet, for instance, "Service for Nokia 6110i" (services for the mobile station Nokia 6110i). An example of a device which could use the services of such service packet is an IR printer, and the service loaded in the printer is, for example, an output control program, which can be loaded by using one or more service loading addresses.

On the following lines, the attribute refers to different types of loading addresses. The type of these is a character string definable by the user (USRSTR). The first reference is a URL address to the Internet information network, the second is a reference to an OBEX object, the third is a reference to a file in a diskette, and the fourth is a reference to a file stored in the local area network. The following four lines contain an example of how an operating system version can be defined in more detail: Windows CE (the fifth line), Windows NT (the sixth line), OS/2 (the seventh line), Psion, (the eighth line). Generally, these loading addresses can be represented in the form

TABLE 2

| Class, attribute | Type | Description |
| --- | --- | --- |
| "IrDa:Install", "Win:ServiceInstall" | INTEGER: 0,1 | Automatic loading blocked/allowed |
| "IrDA:Install", "Description" | USRSTR | Description of the contents of the packet |
| "IrDA:Install", "Win:ServicePath:URL" | USRSTR | WWW URL |
| "IrDA:Install", "Win:ServicePath:OBEX" | USRSTR | OBEX object name |
| "IrDA:Install", "Win:ServicePath:DISK" | USRSTR | Path+file name |
| "IrDA:Install", "Win:ServicePath:LAN" | USRSTR | Local area network path+file name |
| "IrDA:Install", | USRSTR | Windows CE- |

TABLE 2-continued

| Class, attribute | Type | Description |
| --- | --- | --- |
| "WinCE:ServicePath:URL" | | operating system+ WWW URL |
| "IrDA:Install", "WinNT:ServicePath:URL" | USRSTR | Windows NT-operating system+ WWW URL |
| "IrDA:Install", "OS/2:ServicePath:URL" | USRSTR | OS/2-operating system+WWW URL |
| "IrDA:Install", "Psion:ServicePath:URL" | USRSTR | Psion-operating system+WWW URL |

In this context it should be mentioned that the program used for loading the services 704, 705, 706 can be implemented in the host device PC, LPC, PR also in such a way that the installation is not automatically executed, but the user can select the installation of the services 704, 705, 706, if at least one loading address is known. In some situations the loading addresses can be already stored in the host device PC LPC, PR, whereby it is not necessary to try to retrieve them from the external device MS1, MS2, MS3, the services 704, 705, 706 of which are desired to work.

In the aforementioned filtering stage, the installation of services can be restricted case-specifically. This restriction can be based, for example, on the model, manufacturer, device identification, such as IMEI (International Mobile Equipment Identity), subscriber identification, such as IMSI (International Mobile Subscriber Identity), services already installed, or a logical combination of several different factors (AND, OR, NO) relating to the wireless communication device MS1. In this way, the manufacturer of the device can, for instance, control which services can be used in each wireless communication device MS1. Furthermore, the use of a particular service may require that another service is installed. By means of filtering, it is also possible to prevent unauthorized copying and use of the services. Methods according to prior art for preventing unauthorized use are based either on protection by programming or, for example, on a protection device attachable on the connection cable. Protection by programming is not a fully secure protection method. The use of a separate protection device is not always possible, and in any case it causes extra costs.

At the filtering stage information read from the wireless communication device and possibly also information stored in the data processor PC is used to find out whether the use of the service in question is possible or allowed in connection with this wireless communication device MS1.

Filtering can be conducted at the installation stage of the service, as presented above. If the data processor PC stores the service tables 204, 205 in its storage means 2, it will be sufficient to conduct filtering when the wireless communication device MS1 enters the operating range of the local area link for the first time. This method is, however, not suitable for such services the use of which requires, e.g. checking of the device identification, wherein the filtering stage is always executed when the service is started. The filtering stage can also be executed when a new service is added in the data processor. Thus, when the user later activates some other service group of the wireless communication device MS1, the filtering stage is performed in connection with the updating of the external device service table 205. For example, the user brings a wireless communication device MS1, of the model "Nokia 6110i" into the operating range of the local area link. Thus an external device.service table 205 for this wireless communication device is established in the data processor PC. If a wireless communication device which has been identified earlier is later brought into the operating range of the local area link, the service table of this external device is updated and filtering is performed, if necessary.

Table 3 below presents a few additional examples of the contents of the IAS database. This information can also be used at the filtering stage, for example in the following way:
IAS("PnP", "DeviceID"="NMPD900"),
IAS("Device", "DeviceName"="Nokia6110i") AND ("IrDA:TELECOM", "Parameters")

In the first example, the basis for the filtering is the identification of the device, and in the second example, the name of the device and the IrDA parameters.

TABLE 3

| Class, attribute | Type | Description |
| --- | --- | --- |
| "Device", "DeviceName" | USRSTR | Name of the device |
| "Device", "IrLMPSuppot" | OCTETSEQ | IrLMP-parameters |
| "IrcOMM", "IrDA:TinyTP:LsapSel " | INT | Upper layer IrCOMM support |
| "OBEX", "IrDA:TinyTP:LsaSel" | INT | |
| "OBEX:IrXfer", "IrDA:TinyTP:LsaSel" | INT | |
| "IrcOMM", "IrDA:IrLMP:LsapSel" | INT | Lower layer IrCOMM support |
| "IrcOMM", "Parameters" | OCTETSEQ | IrCOMM-parameters |
| "PnP", "Name" | USRSTR | PnP device name |
| "PnP", "Manufacturer" | USRSTR | PnP device manufacturer |
| "PnP", "Category" | USRSTR | PnP device type, e.g. modem="MDM" |
| "PnP", "DeviceID" | USRSTR | PnP device identification, e.g. "NMPD900" |
| "IrDk:TELECOM", "Parameters" | OCTETSEQ | IrCOMM parameters for a telephone set |
| "IrDA:TELECOM", "IrDA:TinyTP: LsapSel" | INT | Upper layer IrDA support |

The present invention is not restricted solely to the embodiments presented above, but it can be varied within the scope of the appended claims.

What is claimed is:

1. A method for installing at least one service of at least one external device in a data processor, wherein said at least one service can be used to control the functions of said external device from the data processor, in which method a local area link is established in order to transfer information between said data processor and at least one said external device, wherein:

said external devices are identified, on the basis of the identification it is defined from at least one of the identified external devices what services are available in it, and on the basis of this information, at least one service packet is installed in the data processor, which service packet contains at least one of said services available in said identified external device;

wherein the data processor comprises:

a data processor service table, which contains information on the services installed in the data processor, and for each external device, an external device service table which contains information on the services available for the external device;

wherein when installing service packets at least the following are performed:

examining where the service packet can be accessed, examining which services contained in the service packet are available in said external device, and adding the identifications of the services available in the data processor service table and in the service table of said external device;

wherein in the installation of the services contained in the service packet, filtering is also performed, in which is determined whether the use of the service under installation is allowed in said external device.

2. A method for installing at least one service of at least one external device in a data processor, wherein said at least one service can be used to control the functions of said external device from the data processor, in which method a local area link is established in order to transfer information between said data processor and at least one said external device, wherein said external devices are identified, on the basis of the identification it is defined from at least one of the identified external devices what services are available in it, and on the basis of this information, at least one service packet is installed in the data processor, which service packet contains at least one of said services available in said identified external device;

wherein the data processor comprises:

a data processor service table, which contains information on the services installed in the data processor, and for each external device, an external device service table, which contains information on the services available for the external device;

wherein when installing service packets at least the following are performed:

examining where the service packet can be accessed, examining which services contained in the service packet are available in said external device, and adding the identifications of the services available in the data processor service table and in the service table of said external device;

wherein when the service is being started in the data processor examining whether the use of the service which is being started is allowed in said external device.

* * * * *

UNITED STATES PATENT AND TRADEMARK OFFICE
CERTIFICATE OF CORRECTION

PATENT NO. : 6,574,678 B1  Page 1 of 1
DATED : June 3, 2003
INVENTOR(S) : Nykanen et al.

It is certified that error appears in the above-identified patent and that said Letters Patent is hereby corrected as shown below:

<u>Title page, Item [54] and Column 1, line 1,</u>
"METHOD FOR INSTALLING SERVICES" should read -- METHOD FOR ALLOCATING RESOURCES FOR DETECTING WIRELESS PERIPHERALS BASED ON THE FUNCTIONS IT PROVIDES WITHOUT MANUAL INTERVENTION --

Signed and Sealed this

Fourth Day of November, 2003

JAMES E. ROGAN
*Director of the United States Patent and Trademark Office*